United States Patent [19]

Chung

[11] Patent Number: 5,157,521

[45] Date of Patent: Oct. 20, 1992

[54] BOTH-SURFACE TRANSMITTING FACSIMILE UTILIZING ONE CIS

[75] Inventor: Byung H. Chung, Seoul, Rep. of Korea

[73] Assignee: Goldstar Co., Ltd., Seoul, Rep. of Korea

[21] Appl. No.: 560,589

[22] Filed: Jul. 31, 1990

[30] Foreign Application Priority Data

Jul. 31, 1989 [KR] Rep. of Korea ............... 10989/1989

[51] Int. Cl.⁵ .......................... H04N 1/04; H04N 1/00
[52] U.S. Cl. ..................... 358/498; 358/496; 358/400
[58] Field of Search ............... 358/496, 498, 400, 401, 358/471, 474, 494; 355/23, 308, 320; 271/3.1, 186

[56] References Cited

U.S. PATENT DOCUMENTS 4,419,007 12/1983 Kingsley ............................ 355/23
4,456,236 6/1984 Buddendeck ..................... 355/320

Primary Examiner—Edward L. Coles, Sr.
Assistant Examiner—Thomas D. Lee

[57] ABSTRACT

A two-surface transmitting facsimile includes an automatic document feeding roll, an automatic document feeding rubber for feeding document paper, a first feed roll, a first pinch roll, a read point sensor for detecting the front end of the document paper, a first eject roll, a second pinch roll, a linear first guide, a first end point sensor for detecting the trailing end of the document paper, trays, a U-shaped second guide for turning over the document paper, a second feed roll, a third pinch roll, a third guide, a second end point sensor for detecting the terminal end of the document paper, a second eject roll and a fourth pinch roll. The eject roll and the pinch roll are respectively provided with first to fourth gears and one way clutch bearings are respectively interposed between the eject roll and the second gear as well as between the feed roll and the gear. As a result, the contents of the top and bottom surfaces of the document papers can be successively transmitted by utilizing only one contact image sensor.

2 Claims, 3 Drawing Sheets

BOTH-SURFACE TRANSMITTING FACSIMILE UTILIZING ONE CIS

BACKGROUND OF THE INVENTION

1. Field of the Invention

The present invention relates to a facsimile and more particularly, to a two surface transmitting facsimile which is made to be able to transmit the contents of both surfaces of a manuscript by setting one time by utilizing one contact image sensor (hereinafter CIS).

2. Description of the Related Art

Various types of facsimiles are well known in the art. One such conventional facsimile is constructed as shown in FIG. 8, which includes an automatic document feeding roll (hereinafter ADR roll) 1 for automatically transmitting the document, an automatic document feeding rubber (hereinafter ADF rubber) 2, a feed roll 3 and a pinch roll 3' for feeding document paper, respectively, a contact image sensor hereinafter 5 for detecting the front end of the document paper, and an eject roll 7 and a pinch roll 7' for discharging the document paper, respectively, and wherein the respectively parts are arranged by turns so that the document paper can be transmitted via a linear conveying path.

According to the above-mentioned conventional facsimile, when a document paper is laid between the ADF roll 1 and ADF rubber 2, the document paper is conveyed in a direction indicated by the arrow of the ADF roll 1 and is passed between the feed roll 3 and pinch roll 3'. When a front point reading sensor 4 is operated, the CIS 5 is turned ON, and while the document paper is transmitted by a transmitting roll 6, its bottom surface is read out and is then discharged via the eject roll 7 and the pinch roll 7'.

Such a transmitting system of the conventional facsimile has a problem that there has been not only a disadvantage that when the document paper is set, only the bottom surface could be transmitted, but also when the top surface is desired to be transmitted, the document paper must turned over and be manually set again.

SUMMARY OF THE INVENTION

Accordingly, it is an object of the present invention to provide a two-surface transmitting facsimile so that te contents of the top and bottom surfaces of the document papers can be successively transmitted by utilizing only one CIS in a state that a plurality of document papers are set only one time.

Another object of the present invention is to provide a two surface transmitting facsimile comprising an automatic document feeding roll and an automatic document feeding rubber for feeding document paper, a first feed roll, a first pinch roll, a read point sensor for detecting the front end of the document paper, a first eject roll, a second pinch roll, a linear first guide, a first end point sensor for detecting the trailing end of the document paper, trays, a U-shaped second guide for turning over the document paper, a second feed roll and a third pinch roll, a third guide, a second end point sensor for detecting the terminal end of the document paper, a second eject roll, and a forth pinch roll wherein the eject roll and the pinch roll are respectively provided with first to fourth gears and one way clutch bearings are respectively interposed between the eject roll and the second gear as well as between the feed roll and gear.

A further object of the present invention is to provide a facsimile which utilizes both surfaces of the document paper which can be automatically transmitted by one CIS continuously by only a single setting, and a single surface of the document paper which can also be transmitted with the same speed as in conventional facsimile.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

Figure 1:
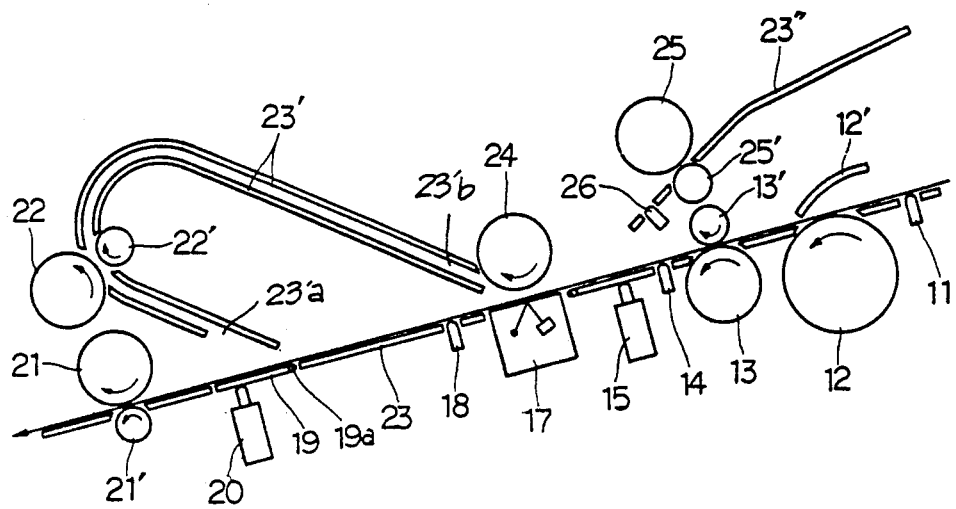
FIGS. 1 to 3 are diagrams for illustrating the construction and operation of transmitting mechanism of the facsimile according to the present invention.
Figure 2:
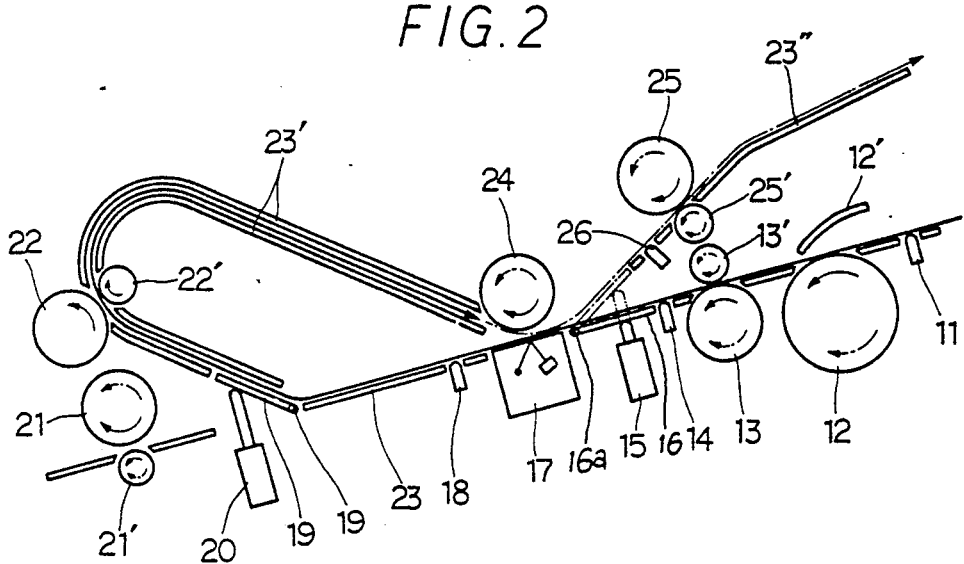

Referring now in detail to the drawings for the purpose of illustrating preferred embodiments of the present invention, the two surface transmitting facsimile as shown in FIGS. 1 to 5, includes a sensor 11 for detecting a presence or an absence of the document paper, and ADF roll 12, an ADF rubber 12', feed rolls 13 and 22, pinch rolls 13' and 22', a read point sensor (hereinafter RPS) 14 for detecting the front end of the document paper, trays 16 and 19 rotatably mounted with hinges 16a and 19a, solenoids 15 and 20 for turning the trays 16a and 19a, a CIS 17 for reading out the document, a transmitting roll 24, end point sensors (hereinafter EPS) 18 and 26 for detecting the trailing end of the document paper, eject rolls 21 and 25, pinch rolls 21' and 25' for discharging the documemt paper, and first, second, and third guides 23, 23' and 23" for guiding the document paper.

The sensor 11 for detecting the presence or absence of the document paper, the ADF roll 12, the feed roll 13, the RPS 14, the solenoid 15, the CIS 17, the EPS 18, the solenoid 20, and the pinch roll 21' are arranged in order below the first linear guide 2. The ADF rubber 12', the pinch roll 13', the transmitting roll 24, and the eject roll 21 are disposed correspondingly to the ADF roll 12, the feed roll 13, the CIS 17, and the pinch roll 21' above the first guide 23.

The tray 16 is mounted to the first guide 23 so as to be positioned between the RPS 14 and the transmitting roll 24. The tray 19 is mounted to the first guide 23 so as to be positioned between the EPS 18 and the pinch roll 21'. The solenoids 15 and 20 are mounted below the trays 16 and 19 respectively.

The tray 16 disposed around the hinge 16a of its left terminal end, and the tray 19 disposed around the hinge 19a of its right terminal end are respectively turned by the operation of the solenoids 16 and 20.

The second guide 23' is adapted to turn over the document paper, which is formed in a U-shaped, and is provided in such a manner that its entrance 23'a is positioned above the tray 19 and its exit 23'b is positioned at in the rear portion of the transmitting roll 24.

The feed roll 22 and the pinch roll 22' are disposed at the inside of the entrance 23'a of the second guide 23'.

The third guide 23" is adapted to discharge the turned over document paper, which is mounted in a slanted direction so as its bottom end portion is positioned above the tray 16. The EPS 26 is provided to the third guide 23, and the eject roll 25 and the pinch roll 25' are provided, downstream to the third guide 23.

Figure 4A:
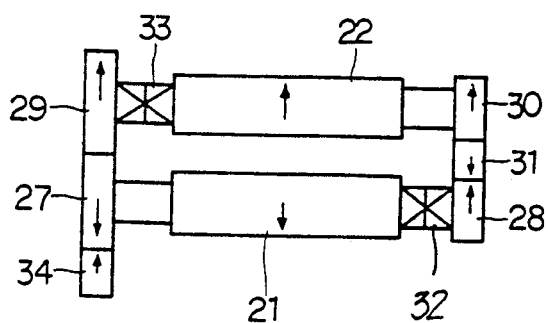
FIGS. 4(A), 4(B), 4(C), and 5(A), 5(B), and 5(C) are fragmentary front views and right and left side views for illustrating the power transmitting structure and operation of an eject roll and a feed roll of the facsimile of the present invention.
Figure 4B:
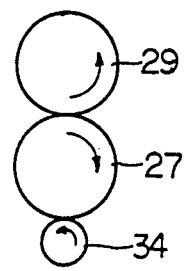
Figure 4C:
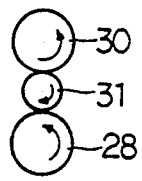

The eject roll 21 and the feed roll 22 as shown in FIG. 4 are connected respectively with first and a third gears 27 and 29 meshing directly with each other at their one end. Second and fourth gears 28 and 30 are respectively connected to the other ends which mesh through an intermediate gear 31. One way clutch bearings 32 and 33 for transmitting or cutting off the driving force are provided between the eject roll 21 and the second gear 28 and also between the feed roll 22 and the gear 29. An input gear 34 is meshed to the first gear 27.

Figure 6:
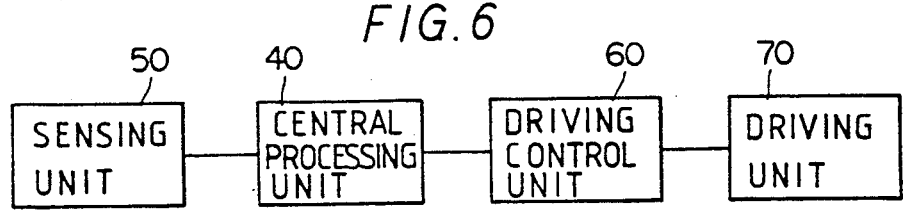
FIG. 6 is a block diagram for illustrating a control system of the facsimile according to the present invention.

FIG. 6 shows a block diagram of a facsimile according to the present invention. The reference numeral 40 represents a central processing unit (CPU), reference numeral 50 is a sensing unit, numeral 60 is a driving control unit means, and numeral 70 is a driving.

The driving unit 70 includes a driving motor and solenoids 15 and 20. The sensing unit 50 includes the RPS 14 for detecting the front end of the document paper, the CIS 17 for reading out the document and the EPS 18 and 26 for detecting the trailing end of the document paper. The central processing unit 40 is connected to a control board of a main body of a machine as well as the sensing unit 50, the driving control unit 60 and driving unit. Thereby, the operation of each unit is controlled.

The central processing unit 40 outputs the control signal to the driving control unit 60 in response to the signals detected at the sensing unit 50. The driving control unit 60 controls the driving unit 70 in response to the control signal.

Figure 7:
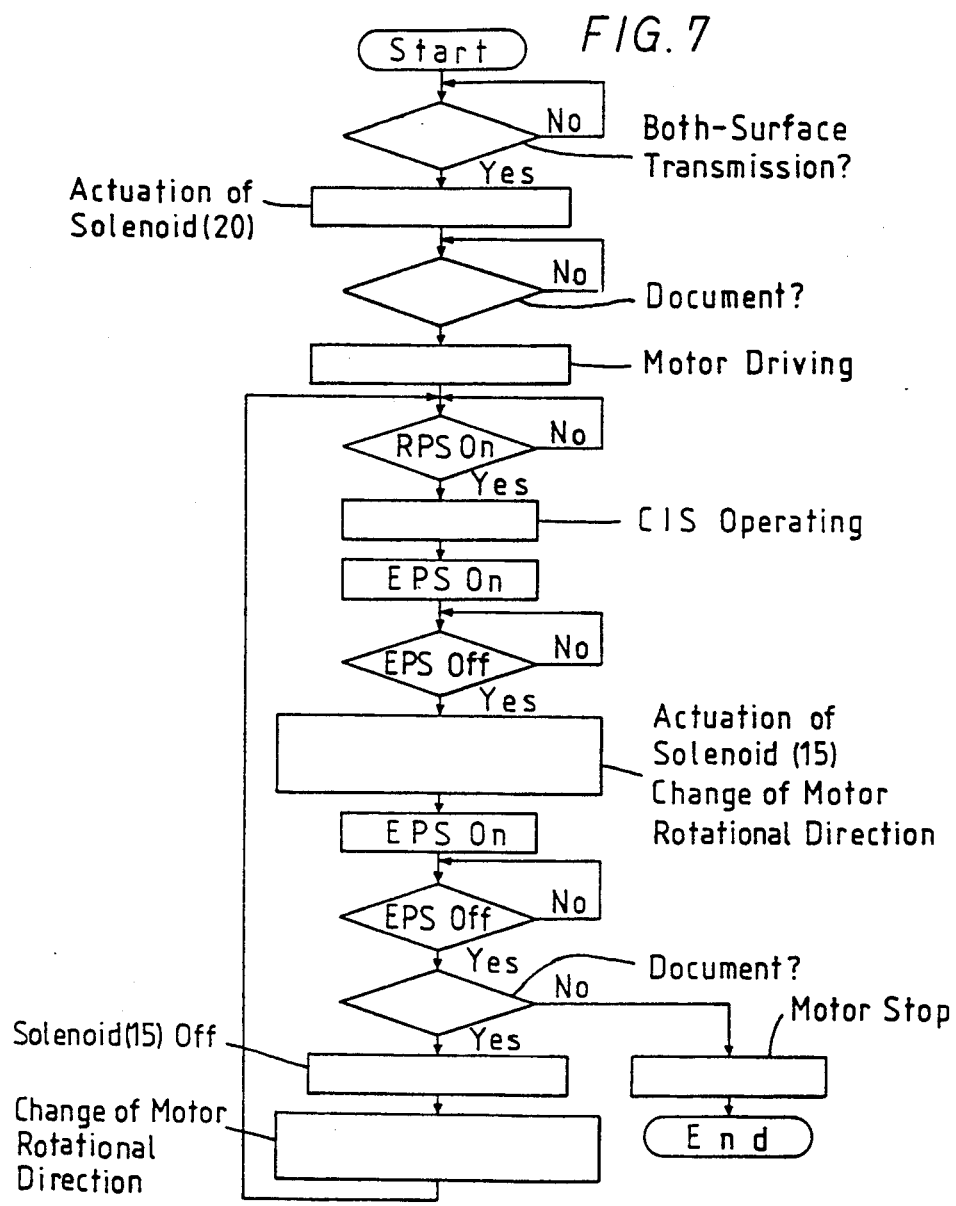
FIG. 7 is a flow chart for showing a two-surface transmitting operation of the facsimile according to the present invention.
Figure 8:
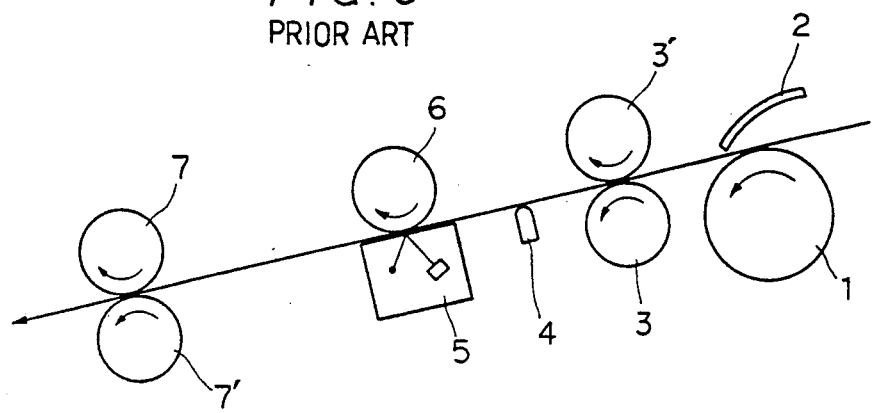
FIG. 8 is a schematic overall diagram of transmitting mechanism of a conventional facsimile.

FIG. 7. shows a flow chart for the operation of a facsimile according to the present invention.

The two-surface facsimile of the present invention operates as follows:

Firstly, in the case where only one surface of the document paper is to be transmitted, as shown in FIG. 1, when the document paper is set, the sensor 11 for detecting the presence or absence of the document paper is operated. According, the, ADF roll 12 is rotated and thereby the document paper passes through the ADF roll 12 and the ADF rubber 12'. When the document paper is conveyed and the RPS 14 is operated, while the CIS 17 is turned ON and the document is conveyed through the tray 14 by the transmitting roll 24, one surface A of the two surfaces A and B of the document paper is read out. The document paper is conveyed successively, passes through the tray 19 is then discharged by the eject roll 21 and the pinch roll 21. When the trailing end of the document paper passes through the EPS 18, the CIS 17 is turned OFF.

In the case where both surfaces of the document paper are to be transmitted, as shown in FIGS. 2 to 7, when a two surface transmitting key is pressed on the control panel, firstly the solenoid 20 is actuated whereby the tray 19 is moved toward the entrance 23'a of the second guide 23'. When a document paper is set, the sensor 11 for detecting the presence or absence of the document paper detects this whereby the ADF roll 12 is driven. The document paper is conveyed between the ADF roll 12 and the ADF rubber 12', and is advanced successively forward by the feed roll 13 and the pinch roll 13'. When the document paper being conveyed actuates the RPS 14, the CIS 17 is turned ON and while the document paper passes through the tray 16 and is conveyed by the transmitting roll 24, the surface A is read out by the CIS 17.

After the front end of the read out document paper is turned ON the EPS 18, the document is conveyed through the tray 19 and the second guide 23' and is conveyed successively by the feed roll 22 and the pinch roll 22'.

Thus, when the document paper is conveyed through the second guide 23', the trailing end of the document paper completely passes through the EPS 18 so that the EPS is turned OFF. At this moment, the solenoid 15 is actuated whereby the tray 16 is moved up toward the third guide 23". Simultaneously with this, the rotational direction of the motor is changed, whereby the transmitting roll 24 is rotated counterclockwise.

Figure 5A:
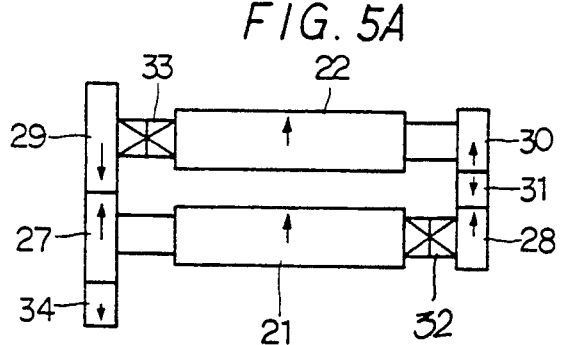
Figure 5B:
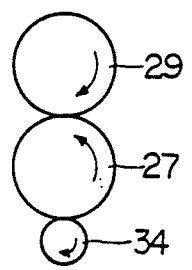
Figure 5C:
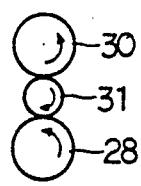

On the other hand, as shown in the FIG. 4, in case where the surface A is to be transmitted, the one way clutch bearing 33 is locked and the other one way clutch bearing 32 is released so that the driving power is transmitted by the one way clutch bearing 33, whereby the eject roll 21 and the feed roll 22 are rotated in opposite directions to each other. However, when the rotational direction of the motor is changed, the driving force input gear 34 is rotated in the opposite direction. At this time, as shown in FIG. 5, the eject roll 21 is rotated in the opposite direction, but the feed roll 22 is rotated in the same direction as in the previous case because the one way clutch bearing 33 is released and another one way clutch bearing 32 is locked. Therefore, even if the rotational direction of the motor is changed, it becomes possible to convey the document paper successively by the food roll 22.

The document paper having been conveyed by the feed roll 22 enters the transmitting roll 24 so that the other side surface B of the document paper is read out by the CIS 17. The front end of the read out document paper passes through the tray 16 and then is turned ON. Thereafter the EPS 26 and thereafter being discharged by the eject roll 25 and the pinch roll 25'.

On the other hand, the ADF roll 12 and the ADF rubber 12' rotate in opposite directions. Thereby, the feeding of the next document papaer is prevented.

Figure 3:
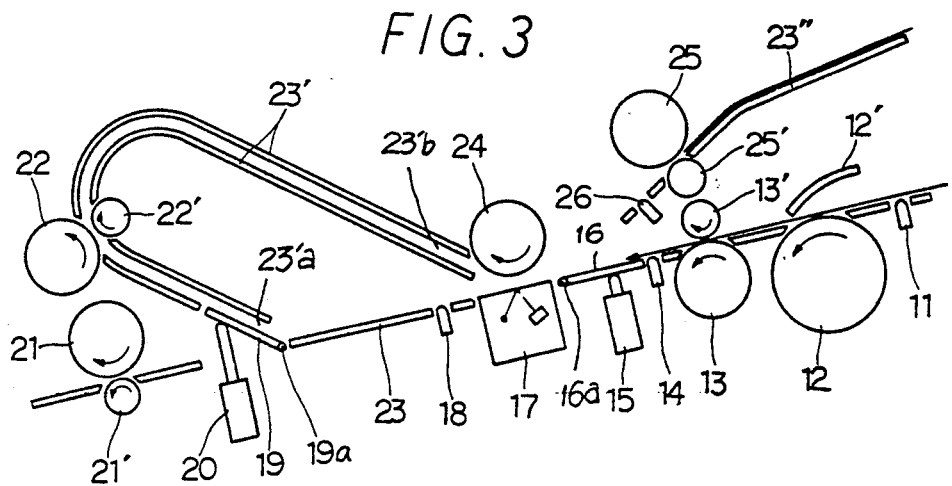

When the document paper is conveyed successively and the trailing end of the document paper is passed through the EPS 26, the EPS 26 is turned OFF. In the case where any more document paper is laid on and the sensor 11 for detecting the presence or absence of the document paper is in the ON-state at a time when the EPS 26 is changing from ON to OFF, the solenoid tray 16 is dropped down and the rotational direction of the motor is changed to a state as illustrated in FIG. 3. Thereafter, the next document paper is conveyed so that the surface A or the surfaces A and B may be transmitted.

According to the present invention as described above, both side surfaces of the document paper can be automatically transmitted by one setting and, the ADF function can be executed simultaneously. In the case where two-surface transmission is not desired, the document paper is not reversely rotated. Therefore, it is possible to transmit the document paper within a prompt period of time and the two surface transmission of the document paper can be obtained by only one CIS.

The invention being thus described, it will be obvious that the same may be varied in many ways. Such variations are not to be regarded as a departure from the spirit and scope of the invention, and all such modifications as would be obvious to one skilled in the art are intended to be included in the scope of the following claims.

What is claimed is:

1. A two-surface transmitting facsimile comprising:
    an automatic document feeding roll and an automatic document feeding rubber for feeding document paper;
    a first feed roll and a first pinch roll;
    a read point sensor for detecting the front end of said document paper;
    a contact image sensor for reading out said document paper;
    a transmitting roll;
    a first eject roll and a second pinch roll arranged in order along with a linear type first guide;
    an end point sensor for detecting the trailing end of said document paper arranged at a portion of the feeding direction of said document paper in back of said contact image sensor;
    a plurality of trays having right and left ends and being pivotally mounted by hinges between said read point sensor and said contact image sensor and between said end point sensor and said first eject roll, respectively;
    a plurality of solenoids mounted below said trays;
    a second guide for turning over the document paper provided between said transmitting roll and said first eject roll above said first guide whereby an entrance and an exit of said second guide are respectively disposed toward said trays;
    a second feed roll and a third pinch roll provided to an inner side of said entrance of said second guide;
    a third guide provided above said first pinch roll and said automatic document feeding rubber, whereby a lower end of said third guide is positioned toward said trays;
    an end point sensor for detecting the trailing end of said document paper mounted at said lower end of said third guide;
    a second eject roll and a fourth pinch roll mounted down stream to the feeding direction of said documemt paper;
    firsts and third gears connected to first side ends of said first eject roll and said first feed roll;
    second and fourth gears meshed through an intermediate gear are connected to second side ends of said first eject roll and said first feed roll;
    one way clutch bearings for transmitting and cutting off the driving force which are respectively provided between said first eject roll and said second gear and between said first feed roll and said third gear; and
    an input gear for transmitting the driving force of a driving motor which is meshed to said first gear.

2. The two surface transmitting facsimile of claim 1, wherein said second guide has a U-shaped configuration.

* * * * *